(12) United States Patent
Deer et al.

(10) Patent No.: US 7,192,113 B2
(45) Date of Patent: Mar. 20, 2007

(54) METHOD AND SYSTEM FOR CORRECTING COLOR SHIFT CAUSED BY PRINTING WITH AN IMAGING SYSTEM USING MULTIPLE CARTRIDGES

(75) Inventors: Anna Yaping Deer, Lexington, KY (US); Xuan-Chao Huang, Lexington, KY (US); Brant Dennis Nystrom, Lexington, KY (US); Richard L. Reel, Lexington, KY (US)

(73) Assignee: Lexmark International, Inc., Lexington, KS (US)

( * ) Notice: Subject to any disclaimer, the term of this patent is extended or adjusted under 35 U.S.C. 154(b) by 263 days.

(21) Appl. No.: 11/063,169

(22) Filed: Feb. 22, 2005

(65) Prior Publication Data

US 2006/0187252 A1    Aug. 24, 2006

(51) Int. Cl.
*B41J 2/205* (2006.01)
(52) U.S. Cl. .......................................... 347/15; 347/43
(58) Field of Classification Search ...................... None
See application file for complete search history.

(56) References Cited

U.S. PATENT DOCUMENTS

| | | | |
|---|---|---|---|
| 5,053,866 A | 10/1991 | Johnson | |
| 6,008,907 A | 12/1999 | Vigneau et al. | |
| 6,072,464 A | * 6/2000 | Ozeki | 345/603 |
| 6,205,246 B1 | 3/2001 | Usami | |
| 6,320,668 B1 | 11/2001 | Kim | |
| RE38,180 E | 7/2003 | Edge | |
| 6,585,343 B2 | 7/2003 | Bauer | |
| 6,679,575 B2 | 1/2004 | Someno | |
| 6,685,290 B1 | 2/2004 | Farr et al. | |
| 6,736,485 B2 | 5/2004 | Kushner et al. | |
| 6,739,699 B1 | 5/2004 | Sender et al. | |
| 6,755,498 B2 | 6/2004 | Revie et al. | |
| 6,776,473 B2 | 8/2004 | Huang et al. | |
| 6,793,308 B2 | 9/2004 | Sugimoto et al. | |

* cited by examiner

*Primary Examiner*—Thinh Nguyen
(74) *Attorney, Agent, or Firm*—Taylor & Aust, P.C.

(57) ABSTRACT

A method of correcting color shift caused by printing with an imaging system using a first cartridge and a second cartridge different from the first cartridge includes determining individual cartridge characterization data based on each of the first cartridge and the second cartridge individually; determining combined cartridge characterization data that characterizes a usage combination of the first cartridge and the second cartridge; and determining color correction data based on the individual cartridge characterization data and the combined cartridge characterization data.

20 Claims, 6 Drawing Sheets

METHOD AND SYSTEM FOR CORRECTING COLOR SHIFT CAUSED BY PRINTING WITH AN IMAGING SYSTEM USING MULTIPLE CARTRIDGES

FIELD OF THE INVENTION

The present invention relates to imaging systems, and, more particularly, to a method and system for correcting color shift caused by printing with an imaging system using multiple cartridges.

DESCRIPTION OF THE RELATED ART

Current imaging systems typically employ two or more replaceable cartridges of different types that are used to disperse a colorant on a print medium. For example, an ink jet printer may employ a CMY cartridge that prints full strength cyan, magenta, and yellow inks, and may also employ a Kcm cartridge that prints full strength black, dilute cyan, and dilute magenta inks.

The color shift from one cartridge to another is a common problem in color reproduction. When an imaging system reproduces colors using colorants from more than one type of cartridge, the reproduced color variations will be more complicated than using a single cartridge. For example, in an imaging system that uses a color cartridge with CMY inks (cyan, magenta, and yellow) and photo cartridge with Kcm inks (black, diluted cyan, and diluted magenta), called CMYKcm imaging system, the output color variation depends not only on the CMY cartridge color shifts but also on the Kcm cartridge color shifts. Correcting the composite color variations is more challenging than single cartridge color correction.

What is needed in the art is a method of correcting color shift caused by printing with an imaging system using multiple cartridges.

SUMMARY OF THE INVENTION

The present invention provides a method of correcting color shift caused by printing with an imaging system using multiple cartridges.

The invention, in one exemplary embodiment, is directed to a method of correcting color shift caused by printing with an imaging system using a first cartridge and a second cartridge different from the first cartridge. The method includes determining individual cartridge characterization data based on each of the first cartridge and the second cartridge individually; determining combined cartridge characterization data that characterizes a usage combination of the first cartridge and the second cartridge; and determining color correction data based on the individual cartridge characterization data and the combined cartridge characterization data.

The invention, in another exemplary embodiment, is directed to an imaging system that performs correction of a color shift caused by printing with a first cartridge and a second cartridge different from the first cartridge. The imaging system includes a print engine configured to mount the first cartridge and the second cartridge, and a controller communicatively coupled to the print engine. The controller executes instructions to retrieve first cartridge signature color data and second cartridge signature color data from a first memory accessible by the imaging system; retrieve first cartridge reference output data and second cartridge reference output data from a second memory accessible by the imaging system; retrieve cross-variation data from the second memory, the cross-variation data being descriptive of a combined colorant output variation of a usage combination of the first cartridge and the second cartridge relative to a colorant output of each of the first cartridge and the second cartridge individually; and determine colorant increment data based on the cross-variation data, the first cartridge signature color data, the second cartridge signature color data, the first cartridge reference output data, and the second cartridge reference output data.

The invention, in still another exemplary embodiment, is directed to a method of correcting color shift caused by printing with multiple cartridges. The method includes determining individual cartridge signature colors; computing relative colorant variation matrices of individual cartridges; estimating cross-variation factor matrices among different types of cartridges; and modifying a lookup table for color correction.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
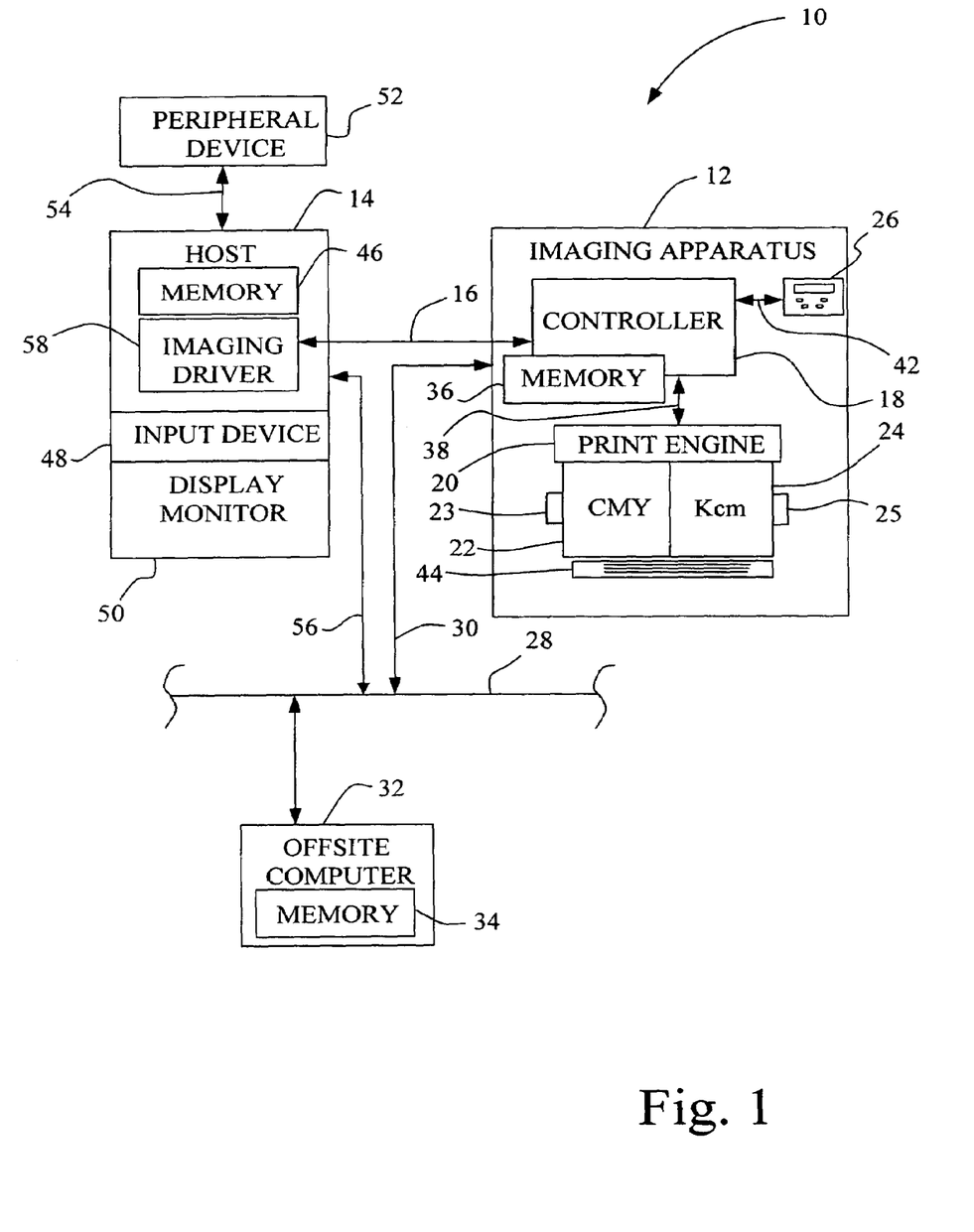
FIG. 1 is a diagrammatic depiction of an imaging system that utilizes the present invention.

Referring now to the drawings, and particularly to FIG. 1, there is shown a diagrammatic depiction of an imaging system 10 embodying the present invention. In the embodiment depicted, imaging system 10 includes an imaging apparatus 12 and a host 14. Imaging apparatus 12 communicates with host 14 via a communications link 16. Alternatively, it is contemplated that imaging system 10 may be an imaging apparatus without a corresponding host computer, such as imaging apparatus 12 in the form of a stand-alone imaging apparatus, wherein the necessary functions of host 14 are performed by imaging apparatus 12 itself.

Imaging apparatus 12 can be, for example, an ink jet printer and/or copier, an electrophotographic printer and/or copier, or an all-in-one (AIO) unit that includes a printer, a scanner, and possibly a fax unit. Imaging apparatus 12 includes a controller 18, a print engine 20, at least two printing cartridges, such as a cartridge 22 having a cartridge memory 23 and a cartridge 24 having a cartridge memory 25, and a user interface 26. Controller 18 is communicatively coupled to print engine 20. Print engine 20 is configured to mount cartridge 22 and cartridge 24, as well as to provide a communicative interface between controller 18, and cartridge memory 23 and cartridge memory 25. Imaging apparatus 12 has access to a network 28, for example, such as the Internet, via a communication line 30, and is capable of interfacing with other systems, such as an offsite computer 32 having an offsite memory 34, in order to transmit and/or receive data for use in carrying out its imaging functions. In the present embodiment, offsite computer 32 is a network server operated by, for example, a manufacturer, distributor and/or retailer of cartridge 22, cartridge 24, imaging apparatus 12, and/or imaging system 10.

Controller 18 includes a processor unit and an associated memory 36, and may be formed as one or more Application Specific Integrated Circuits (ASIC). Controller 18 may be a printer controller, a scanner controller, or may be a combined printer and scanner controller. Although controller 18 is depicted in imaging apparatus 12, alternatively, it is contemplated that all or a portion of controller 18 may reside in host 14. Controller 18 communicates with print engine 20, cartridge 22 and cartridge memory 23, and cartridge 24 and cartridge memory 25 via a communications link 38, and with user interface 26 via a communications link 42. Controller 18 serves to process print data, to operate print engine 20 during printing, and to perform color correction in accordance with the present invention.

In the context of the examples for imaging apparatus 12 given above, print engine 20 can be, for example, a color ink jet print engine or a color electrophotographic print engine, configured for forming an image on a substrate 44, which may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement displays and the like. As an ink jet print engine, print engine 20 operates cartridge 22 and cartridge 24 to eject ink droplets onto substrate 44 in order to reproduce text or images, etc. As an electrophotographic print engine, print engine 20 causes cartridge 22 and cartridge 24 to deposit toner onto substrate 44, which is then fused to substrate 44 by a fuser (not shown).

Host 14 may be, for example, a personal computer, including memory 46, an input device 48, such as a keyboard, and a display monitor 50. A peripheral device 52, such as a digital camera, is coupled to host 14 via a communication link 54. Host 14 further includes a processor, input/output (I/O) interfaces, and is connected to network 28 via a communication line 56, and hence, has access to offsite computer 32, including offsite memory 34. Memory 46 can be any or all of RAM, ROM, NVRAM, or any available type of computer memory, and may include one or more of a mass data storage device, such as a floppy drive, a hard drive, a CD and/or a DVD unit or other optical storage devices.

During operation, host 14 includes in its memory 46 a software program including program instructions that function as an imaging driver 58, e.g., printer/scanner driver software, for imaging apparatus 12. Imaging driver 58 is in communication with controller 18 of imaging apparatus 12 via communications link 16. Imaging driver 58 facilitates communication between imaging apparatus 12 and host 14, and provides formatted print data to imaging apparatus 12, and more particularly, to print engine 20. Although imaging driver 58 is disclosed as residing in memory 46 of host 14, it is contemplated that, alternatively, all or a portion of imaging driver 58 may be located in controller 18 of imaging apparatus 12. Although controller 18 is used to perform color correction in accordance with the present invention, it is alternatively contemplated that all or a portion of the color correction may be performed by imaging driver 58.

Figure 2:
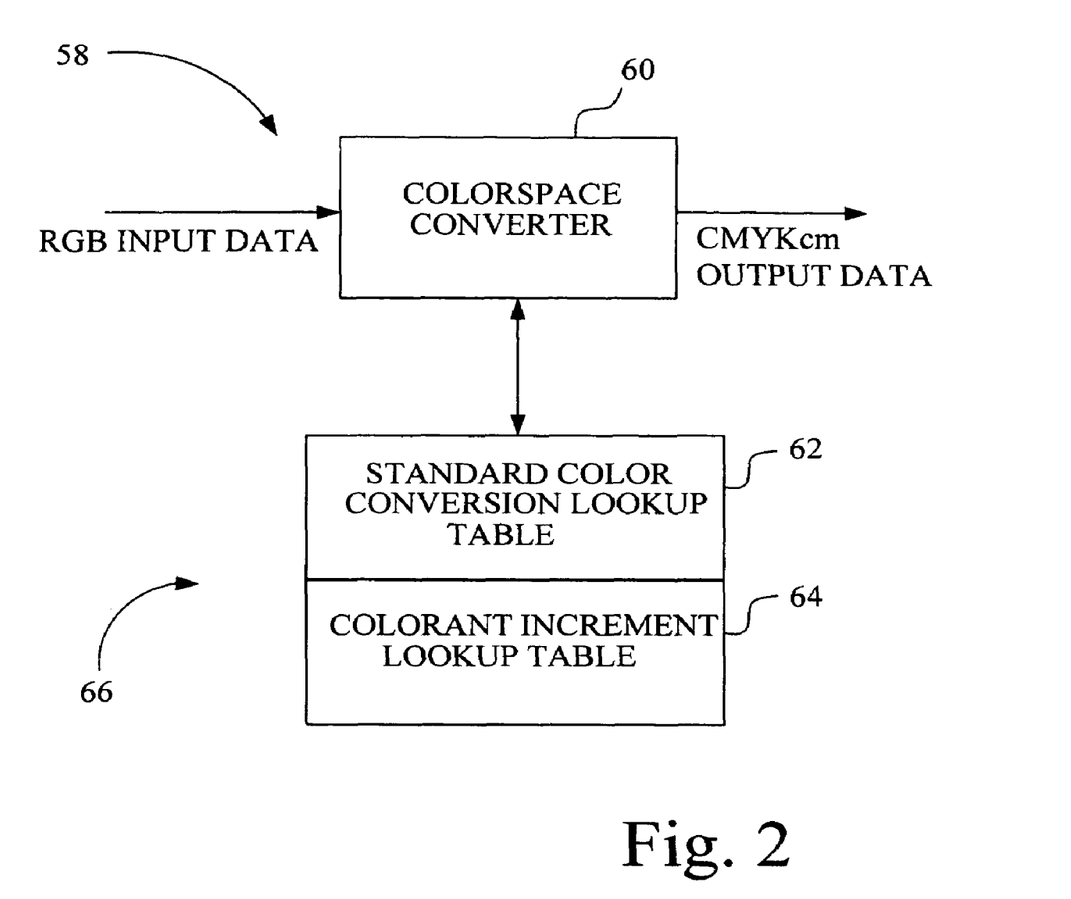
FIG. 2 is a diagrammatic depiction of a colorspace converter accessing a composite color conversion lookup table in accordance with the present invention.

Referring now to FIG. 2, imaging driver 58 includes a colorspace converter 60. Although described herein as residing in imaging driver 58, colorspace converter 60 may be in the form of firmware or software, and may reside in either imaging driver 58 or controller 18. Alternatively, some portions of colorspace converter 60 may reside in imaging driver 58, while other portions reside in controller 18.

Colorspace converter 60 is used for converting color signals from a first colorspace, such as an RGB colorspace employed by display monitor 50 or a scanner, to a second colorspace, for example, CMYK (cyan, magenta, yellow, and black), which is used by print engine 20. The output of colorspace converter 60 may be used to provide multilevel printing, for example, CcMmYyKcm printing, which employs the following ink drop sizes/strengths/compositions: large undiluted cyan dye-based ink drops ("C"), small undiluted cyan dye-based drops ("c"), large undiluted magenta dye-based drops ("M"), small undiluted magenta dye-based ink drops ("m"), large undiluted yellow dye-based ink drops ("Y"), small undiluted yellow dye-based ink drops ("y"), undiluted black pigment-based ink drops ("K"), dilute cyan pigment-based ink drops (second occurrence in "CcMmYyKcm" of "c"), and dilute magenta pigment-based ink drops (second occurrence of "m").

It will be understood that any reference to CMYK may include any combination of the CcMmYyKcm inks, and that any reference to CMY may include any combination of CcMmYy inks. For convenience, however, the present embodiment is described with respect to 6-level CMYKcm printing, wherein, for example, cartridge 22 is a CMY cartridge, and cartridge 24 is a Kcm photo cartridge.

Coupled to colorspace converter 60 are a standard color conversion lookup table 62 and a colorant increment data lookup table 64, which together define a composite color conversion lookup table 66. Standard color conversion lookup table 62 and composite color conversion lookup table 66 are multidimensional lookup tables having at least three dimensions, and include RGB values and CMYKcm values, wherein each CMYKcm output value corresponds to an RGB input value. Standard color conversion lookup table 62 and composite color conversion lookup table 66 may also include other data, such as spectral data, or other values or parameters for use in performing color conversion or color correction.

Standard color conversion lookup table 62 is the basic color conversion lookup table accessed by colorspace converter 60 of imaging apparatus 12 and imaging system 10 for performing color conversion. Colorant increment data lookup table 64 is specifically associated with the present invention method, forming an inventive component of the composite color conversion lookup table 66 used in the color conversion and color correction processes. Colorant increment data lookup table 64 includes incremental color correction data that when employed in conjunction with standard color conversion lookup table 62 as part of composite color conversion lookup table 66 provides color shift corrected color conversion data as output from colorspace converter 60. As shown in FIG. 2, for example, colorspace converter 60 converts input RBG color data for a displayed or scanned image into color shift corrected CMYKcm output data that may be printed by print engine 20 using composite color conversion lookup table 66, hence using colorant increment data lookup table 64 and standard color conversion lookup table 62.

Standard color conversion lookup table 62 incorporates color conversion data to support color conversion via composite color conversion lookup table 66 for multiple color formats and the multiple types of substrate 44. Color formats supported by standard color conversion lookup table 62 and colorant increment data lookup table 64, hence composite color conversion lookup table 66, include, for example, monochrome K output using true black ink only, CMYcm color output, wherein neutral colors are formed using process black, also known as composite black, produced by using a combination of CMYcm color inks, and CMYKcm color printing using a combination of full strength and dilute color inks and true black ink.

Colorant increment data lookup table 64 is a multidimensional lookup table having at least three dimensions that includes multidimensional color data for cartridge 22 and cartridge 24 expressed in a device independent CIELAB colorspace form. Alternatively, colorant increment data lookup table 64 may be in the form of multidimensional CIEXYZ device-independent colorspace data. However, the multidimensional color data of colorant increment data lookup table 64 may be expressed in any convenient device-dependent or device-independent colorspace. It will be understood that colorant increment data lookup table 64 may also include other data, such as spectral data, or other values or parameters for use in performing color conversion or color calibration.

Colorant increment data lookup table 64 is determined based on various data stored in a memory accessible by imaging apparatus 12. The data from which colorant increment data lookup table 64 is determined includes the "signature" colors of cartridge 22 and cartridge 24, such as, for example, the individual color output characteristics of the particular cartridge 22 and the particular cartridge 24 employed in imaging apparatus 12. The signature colors of a cartridge are a small set of colors that can be used to characterize the cartridge, or to classify the cartridge into a class of cartridges with similar color characteristics. In the present embodiment, signature color data for cartridge 22 and cartridge 24 are stored in a memory accessible by imaging apparatus 12, for example, cartridge memory 23 and cartridge memory 25, and read into memory 36 of controller 18, or, alternatively, read into the memory storing imaging driver 58. Alternatively, it is contemplated that the signature color data for cartridge 22 and cartridge 24 may be stored in offsite memory 34 of offsite computer 32, and retrieved by imaging system 10, e.g., by imaging apparatus 12 and/or host 14, and stored into memory 36 of controller 18, or, alternatively, the memory storing imaging driver 58.

The data from which colorant increment data lookup table 64 is determined also includes reference data, which is standardized data reflecting testing performed on many cartridges of same type of cartridge as cartridge 22, e.g., CMY cartridges, and of the same type of cartridge as cartridge 24, e.g., Kcm cartridges. In the present embodiment, the testing includes printing and colorimetrical measuring of printed test patches. Reference data includes cartridge 22 reference output data that reflects the output of the average cartridge 22, created, for example, by averaging the test results of many color patches printed by only cartridges of the same type as cartridge 22. Similarly, the reference data includes cartridge 24 reference output data that reflects the output of the average cartridge 24, created, for example, by averaging the test results of many color patches printed by only cartridges of the same type as cartridge 24. In the present embodiment, cartridge 22 reference output data and cartridge 24 reference output data are stored in a memory accessible by imaging apparatus 12, for example, memory 36 of controller 18. Alternatively, it is contemplated that cartridge 22 reference output data and cartridge 24 reference output data may be stored along with imaging driver 58. In addition, updates to cartridge 22 reference output data and cartridge 24 reference output data may be made accessible to imaging system 10 via offsite computer 32.

In addition, colorant increment data lookup table 64 is also determined based on cross-variation data that is descriptive of a combined colorant output variation of a usage combination of the type (e.g., model or color type, such as a CMY or Kcm cartridge) of cartridge 22 and the type of cartridge 24 relative to a colorant output of each of the types of cartridges used individually, and hence, descriptive of the combined colorant output variation of the usage combination of cartridge 22 and cartridge 24 relative to a colorant output of each of cartridge 22 and cartridge 24 individually. For example, the printed output using cartridge 22 individually and the printed output of cartridge 24 individually may have different diffraction and reflection characteristics than if both cartridge 22 and cartridge 24 were used in combination to provide a printed output, such as where a portion of an image is created using colorants from both cartridge 22 and cartridge 24. The different diffraction and reflection characteristics may be due to the interaction of the colorants employed in cartridge 22 and those employed in cartridge 24. In addition, if portions of an image were printed solely with cartridge 22, but were adjacent to portions of the image printed solely by cartridge 24, the user may notice discrepancies owing to the different diffraction and reflection characteristics of the colorants as between the different cartridges.

In the embodiment described herein, the colorant increment data is arranged in colorant increment data lookup table 64 in an ordered format for access by colorspace converter 60, wherein the order of the data allows colorspace converter 60 to correlate the data of colorant increment data lookup table 64 with the similarly ordered data of standard color conversion lookup table 62 in defining composite color conversion lookup table 66.

Each of standard color conversion lookup table 62, colorant increment data lookup table 64, and composite color conversion lookup table 66 may alternatively be in the form of groups of polynomial functions capable of providing the same multidimensional output as if in the form of lookup tables.

The present invention provides a method and system for correcting the color shift caused by multiple cartridge variations, e.g., as between cartridge 22 and cartridge 24, for use in imaging apparatus 12 and imaging system 10, in order to prevent the color shift in printed output that typically occurs due to variations between different cartridges. The variations between different cartridges may include, for example, those differences resulting from manufacturing and assembly tolerances, subcomponent tolerances, the use of different manufacturers or different manufacturing lots, and/or variations in ink compositions or ink coloring agents. Thus, by virtue of the present invention, different cartridges, e.g., cartridge 22 and cartridge 24, may be employed by a user, a first time or subsequent times, while providing consistent color reproduction, without regard to changing or replacing a particular cartridge that has reached the end of its useful life or run out of ink, or reached the end of its use for a current imaging job.

Figure 3:
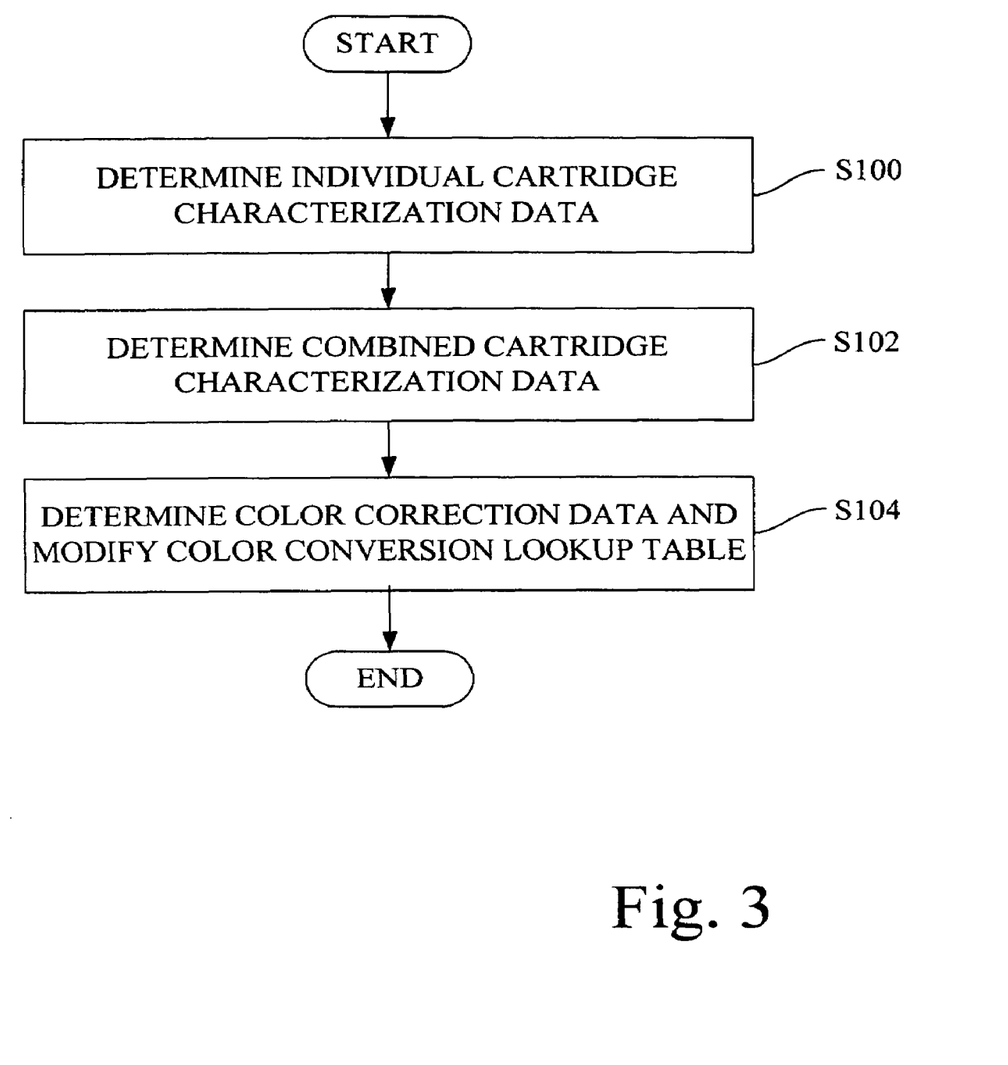
FIG. 3 is a flowchart that depicts method steps according to an embodiment of the present invention.

Referring now to FIG. 3, steps S100–S104 generally describe a method of correcting color shift caused by printing with imaging system 10 using cartridge 22 and cartridge 24 different from cartridge 22. Although the present embodiment is described with respect to two different cartridges, those skilled in the art would appreciate that the present invention is suited to the use of any number of different cartridges, each having any number of colorants.

At Step S100, individual cartridge characterization data based on each of cartridge 22 and cartridge 24, individually, is determined. The individual cartridge characterization data pertains to the output of a particular cartridge that may be used to characterize that particular cartridge.

Step S100 is described below in greater detail with respect to steps S100-1 to S100-9 of FIG. 4.

At step S102, combined cartridge characterization data that characterizes a usage combination of cartridge 22 and cartridge 24 is determined. Combined cartridge characterization data pertains to data that characterizes a visual effect of an interaction between a colorant of cartridge 22 and a colorant of cartridge 24, such as when both cartridges are used to render an image or portions of an image. More specifically, the combined cartridge characterization data addresses visual effects of the interaction, including at least a diffraction difference and/or a reflection difference as between portions of an image printed with a combination of one or more cartridge 22 colorants and one or more cartridge 24 colorants, portions of the image printed using cartridge 22 colorants individually, e.g., portions printed using one or more colorants from only cartridge 22, and portions of the image printed using cartridge 24 colorants individually, e.g., portions printed using one or more colorants from only cartridge 24. Such visual effects are caused by different diffraction and reflection characteristics as between the colorants used in cartridge 22 and the colorants used in cartridge 24.

Step S102 is described below in greater detail with respect to steps S102-1 to S102-9 of FIG. 5.

At Step S104, color correction data is determined based on the individual cartridge characterization data determined in step S100 and the combined cartridge characterization data determined in step S102, standard color conversion lookup table 62 is modified based on the color correction data for printing using cartridge 22 and cartridge 24.

Step S104 is described below in greater detail with respect to steps S104-1 to S104-15 of FIG. 6.

Figure 4:
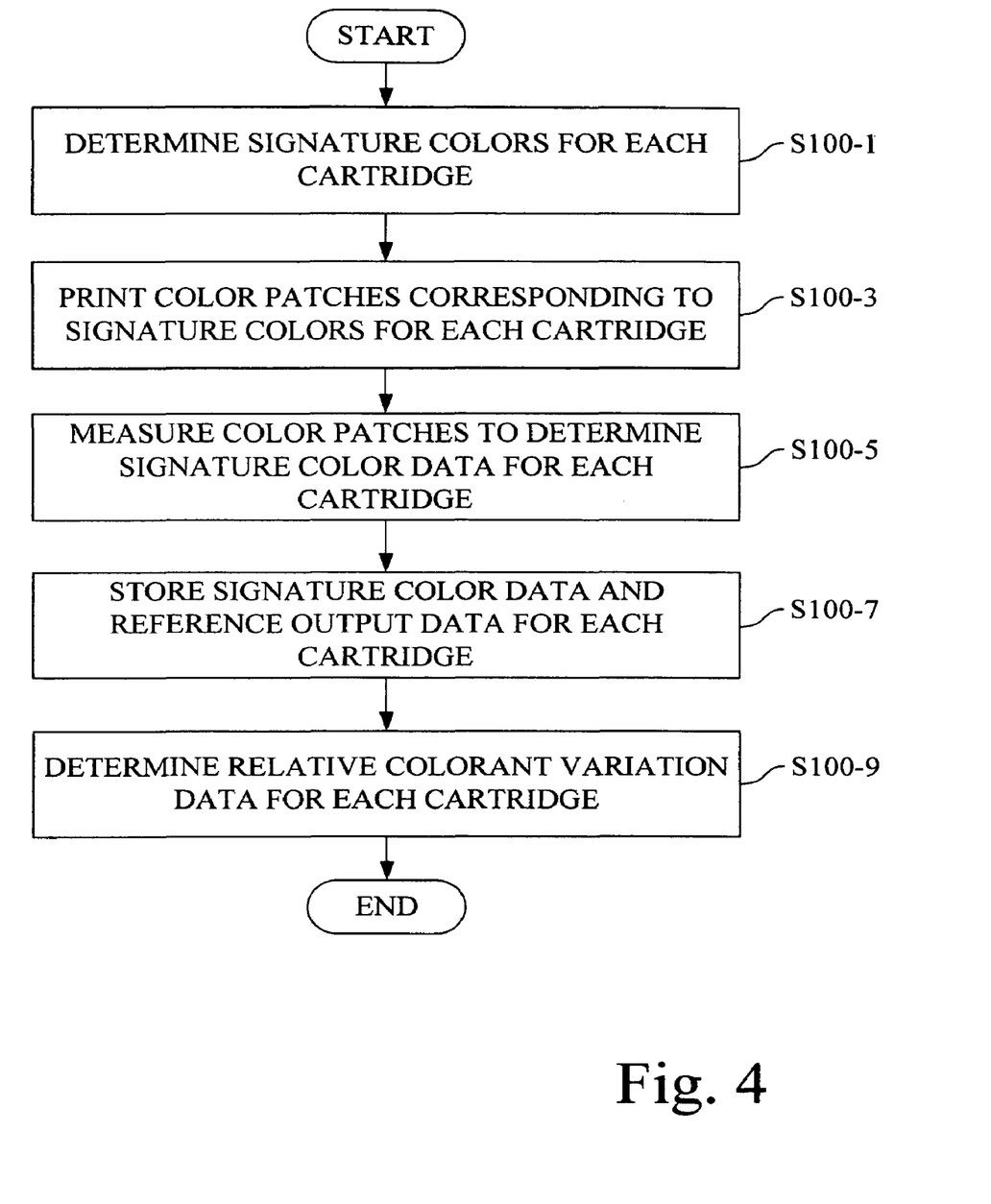
FIG. 4 is a flowchart that depicts a method of determining individual cartridge characterization data in accordance with an embodiment of the present invention.

Referring now to FIG. 4, the determination of individual cartridge characterization data based on each of cartridge 22 and cartridge 24, individually, as set forth in step S100 of FIG. 3, is described in detail below with respect to steps S100-1 to S100-9. The processes described in steps S100-1 to S100-9 are performed at the factory, e.g., by the manufacturer of cartridge 22, cartridge 24, imaging apparatus 12, and/or imaging system 10.

At step S100-1, a plurality of signature colors for cartridge 22 and a plurality of signature colors for cartridge 24 are determined. The signature colors are determined for each particular cartridge 22 and particular cartridge 24 that are manufactured for sale, for use in characterizing the output of the particular cartridge 22 to be installed in imaging apparatus 12 and the particular cartridge 24 to be installed in imaging apparatus 12, respectively. In addition, the signature colors for many produced cartridges of the type corresponding to cartridge 22 and of the type corresponding to cartridge 24, are used for establishing cartridge 22 reference output data and cartridge 24 reference output data.

The signature colors of a cartridge are a small set of colors that can be used to classify the cartridge into a class of cartridges with similar color characteristics. The method of selecting signature colors is as follows: For each color of ink, select n even-spaced points over the whole range. The number of all combinations of the n points will be $n^3$ for each of CMY cartridge 22 and the Kcm cartridge 24. This will include the individual channel properties and their cross talks. Since the individual channel properties are very important, m more even-spaced points between above-selected two neighboring points are selected for each color of ink, yielding a total of m(n−1) more points for each color ink. Thus, the total number (N) of the signature colors for each 3-color ink cartridge will be:

$$N=n^3+3m(n-1) \tag{Equation 1}$$

Theoretically, the more color points that are selected for the signature color, the more accurate the color correction will be. Considering cost limitations (time and materials for printing and measuring color patches, memory size, etc.), system errors, and accuracy together, a value of N=33 (n=3, m=1) for each 3-color ink cartridge has been found suitable for performing accurate color correction in accordance with the present invention.

In principle, the above method of selecting signature colors corresponds to selecting the cellular Neugebauer colors. The number of the cellular levels is n and the number of points of area coverage for each ink is m(n−1)+n. By using the Neugebauer model and the selected signature colors, the CIELAB values for any points in the colorant space can be computed.

At step S100-3, color patches are printed corresponding to the signature colors for each of cartridge 22 and cartridge 24. The color patches corresponding to the signature colors of cartridge 22 are printed using only cartridge 22, and the patches corresponding to the signature colors of cartridge 24 are printed using only cartridge 24. The color patches for each cartridge are printed as part of the manufacturing process for the cartridge, and hence, step S100-3 is performed independently, and likely at different times, for cartridge 22 and for cartridge 24.

In addition, color patches are printed for many produced cartridges of the type corresponding to cartridge 22 and of the type corresponding to cartridge 24, which are used for establishing cartridge 22 reference output data and cartridge 24 reference output data. For example, by printing and measuring color patches corresponding to many cartridges of the type corresponding to cartridge 22 and of the type corresponding to cartridge 24, the characteristics of the type of cartridge corresponding to cartridge 22 may be averaged, and the characteristics of the type of cartridge corresponding to cartridge 24 may be averaged, respectively. The respective averaged values are then used as reference data representative of the nominal output of a cartridge corresponding to the same type as cartridge 22 (cartridge 22 reference output data), and as reference data representative of the nominal output of a cartridge corresponding to the same type as cartridge 24 (cartridge 24 reference output data).

The status of a color reproduction system without color corrections is referred as "default status." The signature colors of each cartridge are produced by the color reproduction system under the "default status" using a preselected substrate.

At step S100-5, the color patches are measured to determine cartridge signature color data. For example, the color patches corresponding to the signature colors of cartridge 22 are measured to obtain cartridge 22 signature color data corresponding to the particular cartridge 22 to be installed in imaging apparatus 12, and the patches corresponding to the signature colors of cartridge 24, are measured to obtain cartridge 24 signature color data corresponding to the particular cartridge 24 to be installed in imaging apparatus 12. These signature colors are measured with a spectrophotometer to obtain CIEXYZ or CIELAB values. The color patches for each cartridge are measured as part of the manufacturing process for the cartridge, and hence, step S100-5 is performed independently, and likely at different times, for cartridge 22 and for cartridge 24.

At step S100-7, the signature color data for cartridge 22 and for cartridge 24 are stored in a memory accessible by imaging system 10. The signature color data for each cartridge is stored as part of the manufacturing process for the cartridge, and hence, step S100-7 is performed independently, and likely at different times, for cartridge 22 and for cartridge 24.

The signature color data may be stored in one of many ways. For example, in the present embodiment, the signature color data is stored in cartridge memory, e.g., cartridge memory 23 for cartridge 22 signature color data, and cartridge memory 25 for cartridge 24 signature color data. Alternatively, it is contemplated that the signature color data may be stored in offsite memory 34 of offsite computer 32 in a database containing signature color data for each cartridge on a serial number basis, in the event that cartridge memory is not available. As another alternative, if a cartridge has only several bits of memory available, each cartridge may be classified into one of a pre-defined number of classes based on the characteristics of its signature colors, and the class number would be stored in the cartridge memory (e.g., cartridge memory 23 for cartridge 22 signature color data, and cartridge memory 25 for cartridge 24 signature color data). The signature color values of the middle-level cartridge of each class would be stored as part of imaging driver 58 or in memory 36.

In addition, standard cartridge data, e.g., cartridge 22 reference output data and cartridge 24 reference output data reflecting the output of typical cartridges of the types corresponding to cartridge 22 and cartridge 24, respectively, is stored in a memory accessible to imaging system 10, such as memory 36 of controller 18. Alternatively, it is contemplated that cartridge 22 reference output data and cartridge 24 reference output data may be stored as part of imaging driver 58, or may be stored in offsite memory 34 of offsite computer 32.

Generally, when a new cartridge or cartridges are installed, imaging system 10 will retrieve the signature color data, and then a signature color profile for each cartridge is computed using the Neugebauer model as illustrated below:

$$\xi_i = f_i(\phi_i) i=0,1,\ldots,q-1 \quad \text{(Equation 2)}$$

where $\xi_i$ is a color point $(L^*_i, C^*_i, h^*_i)$ in the CIELAB color space wherein $L^*_i$ is the lightness of the color point, $C^*_i$ is the chroma of the color point, and $h^*_i$ is the hue angle of the color point, $\phi_i$ is a colorant point in the cartridge colorant space, and $f_i$ denotes that $\xi_i$ is a function of $\phi_i$ implemented as a lookup table or a group of polynomial functions by using the signature colors of the cartridge. The subscription "i" is an index to cartridge i installed on the printer and q is the number of cartridges installed on the printer. For example, a CMYKcm printer will have: q=2 (two cartridges: cartridge 22 and cartridge 24), $\phi_0$=(C, M, Y), and $\phi_1$=(K, c, m).

In addition, imaging system 10 and/or imaging driver 58 will retrieve the corresponding standard cartridges' signature colors (e.g., cartridge 22 reference output data and cartridge 24 reference output data, reflecting the output of typical cartridges of the types corresponding to cartridge 22 and cartridge 24, respectively), and compute the standard signature color profiles:

$$\xi_{si} = f_{si}(\phi_{si}) i=0,1,\ldots,q-1 \quad \text{(Equation 3)}$$

where the subscription "s" denotes "standard cartridge" (e.g., standard CMY cartridge representing the average cartridge 22, or standard Kcm cartridge representing the average cartridge 24). The colorant point $\phi_i$ or $\phi_{si}$ can be represented by a one-row matrix (vector):

$$\phi_i = (x_{i0}, x_{i1}, \ldots, x_{i,v-1}) i=0,1,\ldots,q-1 \quad \text{(Equation 4)}$$

and $$\phi_{si} = (x_{si0}, x_{si1}, \ldots, x_{si,v-1}) i=0,1,\ldots,q-1 \quad \text{(Equation 5)}$$

where x is an ink digital count and v is the number of inks in a cartridge.

At step S100-9, cartridge 22 relative colorant variation data is determined based on based on cartridge 22 signature color data. Cartridge 22 relative colorant variation data is descriptive of a colorant output variation of cartridge 22 relative to cartridge 22 reference output data. For example, cartridge 22 relative colorant variation data mathematically describes, for the cartridge 22 signature colors, the amount of printed color variation using cartridge 22 as compared to the standard cartridge 22 represented by cartridge 22 reference output data.

Similarly, cartridge 24 relative colorant variation data, which is descriptive of a colorant output variation of cartridge 24 relative to cartridge 24 reference output data, is determined based on based on cartridge 24 signature color data. As with cartridge 22 relative colorant variation data, cartridge 24 relative colorant variation data mathematically describes, for the cartridge 24 signature colors, the amount of printed color variation using cartridge 24 as compared to the standard cartridge 24 represented by cartridge 24 reference output data.

The determination of cartridge 22 relative colorant variation data and cartridge 24 relative colorant variation data is set forth below. In the present embodiment, cartridge 22 relative colorant variation data and cartridge 24 relative colorant variation data take the form of matrices. However, those skilled in the art would appreciate that cartridge 22 relative colorant variation data and cartridge 24 relative colorant variation data may take any convenient form without departing from the scope of the present invention. For example, cartridge 22 relative colorant variation data and cartridge 24 relative colorant variation data may take the form of groups of polynomials.

A relative colorant variation matrix $R_i$ for cartridge "i" at a colorant point is defined as an array of elements $(r_{ij})$ arranged in one row, where the index j ranges from 0 to (v−1). That is, the number of elements in $R_i$ is equal to the number of inks of the cartridge. The relative colorant variation matrix $R_i$ is represented by $$R_i = \{r_{ij}\} i=0,1,\ldots,q-1, j=0,1,\ldots,v-1 \quad \text{(Equation 6)}$$

Each of the elements is computed by $$r_{ij} = \frac{\Delta x_{ij}}{x_{sij}} \quad \text{(Equation 7)}$$

where $\Delta x_{ij}$ is the colorant change required for a non-standard cartridge (e.g., the particular cartridge 22 and the particular cartridge 24 to be installed in imaging apparatus 12) to produce the same color as the standard cartridge at the colorant digital count $x_{sij}$.

The computational procedure for the colorant change $\Delta x_{ij}$ is as follows:

For a given colorant point ($\phi_{si}$), compute the color value ($\xi_{si}$) for the standard cartridge using Equation 3.

Use the color value ($\xi_{si}$) to replace the left-side value ($\xi_i$) of non-standard cartridge's Equation 2 and then perform inverted computation to find an associated colorant point ($\phi_i$).

The colorant change $\{\Delta x_{ij}\}$ will be equal to $\phi_i - \phi_{si} = \{x_{ij} - x_{sij}\}$, that is $$\Delta x_{ij} = x_{ij} - x_{sij}, i=0,1,\ldots,q-1, j=0,1,\ldots,v-1 \quad \text{(Equation 8)}$$

Figure 5:
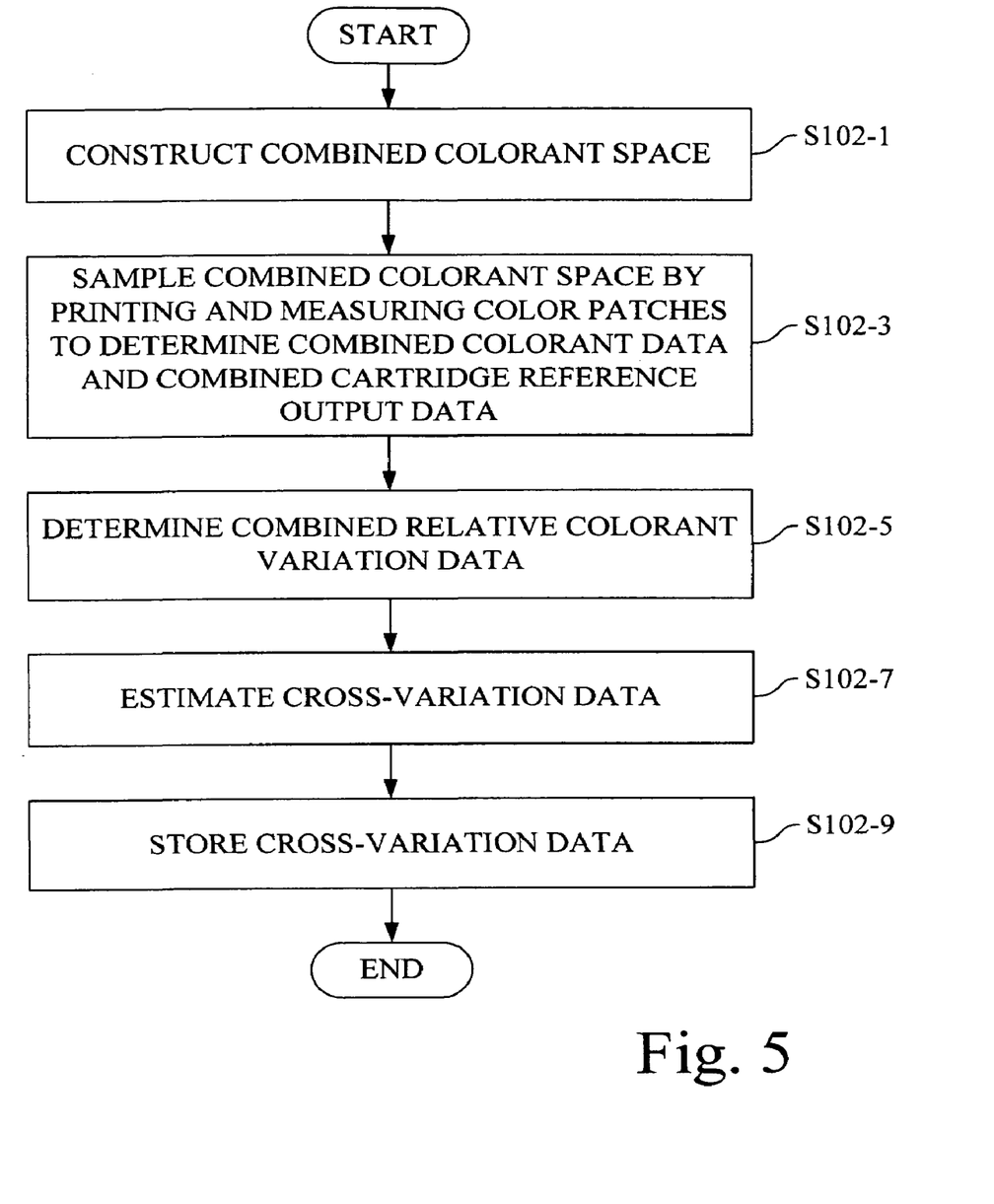
FIG. 5 is a flowchart that depicts a method of determining combined cartridge characterization data in accordance with an embodiment of the present invention.

Referring now to FIG. 5, the determination of combined cartridge characterization data that characterizes a usage combination of cartridge 22 and cartridge 24, as set forth in step S102 of FIG. 3, is described in detail below with respect to steps S102-1 to S102-9. The processes described in steps S102-1 to S102-9 are performed at the factory, e.g., the manufacturer of cartridge 22, cartridge 24, imaging apparatus 12, and/or imaging system 10.

The signature color of a cartridge is produced using the colorants only from the cartridge itself and has nothing to do with the other colorants from the other types of cartridges installed on the same printer. However, the color reproduction of imaging apparatus 12 may use colorants from all of the types of cartridges installed in imaging apparatus 12. The relative colorant variation (RCV) from one type of cartridge alone may be different than that from two or more types of cartridges. On a CMYKcm printer, for example, the RCV of cyan (C) from the CMY cartridge at colorant point (20, 20, 20) (i.e., C=M=Y=20) will be different from that at the combined colorant point of the CMY and Kcm cartridges (cartridge 22 and cartridge 24, respectively) with the same CMY colorants: (20, 20, 20, 0, 200, 200) (i.e., C=M=Y=20, K=0, c=m=200). This is because of the interaction of the diffraction and reflection between the CMY and Kcm colorants. This interaction cannot be estimated from the individual cartridge signature colors alone since they are measured without the presence of the other type of cartridge's colorants. It is also difficult to measure the interaction online (e.g., by a user using imaging apparatus 12 and/or imaging system 10) since different types of cartridges installed on a printer are usually from different production lines. Described below is a method of estimating the interaction among different types of cartridges through offline measurements.

At step S102-1, a combined colorant space is constructed. A combined colorant space is a multidimensional space in which a colorant point contains all colorants from all types of cartridges installed on the printer, e.g., all colorants from both cartridge 22 and cartridge 24 (some of the colorant digital counts at the point may be zeros). For example, a CMYKcm printer will have a combined colorant space in which each colorant point has (C, M, Y, K, c, m) colorants. The combined colorant space is made up of many colorant points across the spectrum of colors printed using a combination of cartridge 22 and cartridge 24, which are sampled (e.g., printed and colorimetrically measured), as well as the same number of colorant points printed using many sets of cartridges, each set including a different cartridge of the same type as cartridge 22 and a different cartridge of the same type as cartridge 24, and measuring each colorant point. These colorant points are collectively referred to as combined colorant data.

The symbol $\phi_c$ (subscription c denotes "combined colorant space") is used herein to describe a combined colorant point for non-standard cartridges:

$$\phi_c = (x_{c00}, x_{c01}, \ldots, x_{c0,v-1}, x_{c10}, x_{c11}, \ldots, x_{c1,v-1}, \ldots, x_{cq-1,1}, x_{cq-1,2}, \ldots, x_{cq-1,v-1}) \quad \text{(Equation 9)}$$

In addition, the symbol $\phi_{sc}$ is used herein to describe the combined colorant space for the standard cartridges, for example, combined cartridge reference output data:

$$\phi_{sc} = (x_{sc00}, x_{sc01}, \ldots, x_{sc0,v-1}, x_{sc10}, x_{sc11}, \ldots, x_{sc1,v-1}, \ldots, x_{scq-1,1}, x_{scq-1,2}, \ldots, x_{scq-1,v-1}) \quad \text{(Equation 10)}$$

where x is ink digital count. As seen in Equations 4 and 9, or Equations 5 and 10, a colorant point of an individual cartridge is a subset of a combined colorant point.

Combined cartridge reference output data is standardized data reflecting testing performed on many cartridges of same type of cartridge as cartridge 22, e.g., CMY cartridges, used in conjunction with cartridges of the same type of cartridge as cartridge 24, e.g., Kcm cartridges, used in combination. In the present embodiment, the testing includes the printing and colorimetrically measuring of test patches printed using a cartridge set made up of a cartridge of the same type as cartridge 22 and a cartridge of the same type as cartridge 24, used in combination with each other, as required to produce the color patches in accordance with the combined colorant space. The combined cartridge reference output data, reflecting the output of the average cartridge 22 when used in combination with the average cartridge 24, is created, for example, repeating the printing and measuring of color patches corresponding to the combined colorant space, using many cartridge sets, and by averaging the test results of many color patches printed by using a combination of cartridges of the same type as cartridge 22, and cartridges of the same type as cartridge 24.

In the present embodiment, the combined cartridge reference output data is stored in a memory accessible by imaging apparatus 12, for example, memory 36 of controller 18. Alternatively, it is contemplated that cartridge 22 reference output data and cartridge 24 reference output data may be stored along with imaging driver 58, or in offsite memory 34 of offsite computer 32.

At step S102-3, the combined colorant space is sampled by printing a plurality of color patches using both cartridge 22 and cartridge 24 in combination, and measuring the plurality of color patches to determine the combined colorant data. Step 102-3 also includes printing a plurality of color patches using a cartridge set made up of a cartridge of the same type as cartridge 22 and a cartridge of the same type as cartridge 24, used in combination, measuring the plurality of color patches to determine combined colorant data, and repeating a plurality of times the printing of a plurality of color patches and measuring the plurality of color patches using different sets of cartridges, each of the different sets being made up of a different cartridge of the same type as cartridge 22 and a different cartridge of the same type as cartridge 24, used in combination, to determine combined colorant data.

Similar to the signature color sampling of individual cartridges, the procedures of step S102-3 are used for sampling the combined colorant space. For each color of ink, $n_c$ even-spaced points are selected over the whole range. The number of all combinations of the $n_c$ points will be $n_c^6$ for a CMYKcm printer (6-inks). This will include the individual channel properties and their cross talks. Since the individual channel properties are very important, $m_c$ more even-spaced points are selected between the above-selected two neighboring points for each color of ink—a total of $m_c(n_{c-1})$ more points for each color ink. Thus, the total number ($N_c$) of the color points for a cartridge set of 6-color inks will be:

$$N_c = n_c^6 + 6m_c(n_c - 1) \quad \text{(Equation 11)}$$

In practice, the inventors have found that $N_c=741$ ($n_c=3$, $m_c=1$) selected for a cartridge set of 6-color inks and provides acceptable color correction results.

As set forth above with respect to step S100-1, the above method described in step S102-3 corresponds to selecting the cellular Neugebauer colors. The number of the cellular levels is $n_c$ and the number of points of area coverage for each ink is $m_c(n_c-1)+n_c$. By using the Neugebauer model and the selected colors, the CIELAB values for any points in the combined colorant space may be computed.

For non-standard cartridge set on the printer, the color profile of the combined colorant space is given by $$\xi_c = f_c(\phi_c) \quad \text{(Equation 12)}$$

For standard cartridge set on the printer, the color profile of the combined colorant space is given by $$\phi_{sc} = f_{sc}(\phi_{sc}) \quad \text{(Equation 13)}$$

where $\xi_c$ or $\xi_{sc}$ is a color point (L*, C*, h*) in the CIELAB color space, $f_c$ or $f_{sc}$ denotes the function relationship implemented as a lookup table or a group of polynomial functions, $\phi_c$ or $\phi_{sc}$ is a colorant point in the combined colorant space, subscription "c" denotes "combined colorant space", and subscription "s" denotes "standard cartridge".

Color patches are printed based on the colorant points determined above and described with respect to Equations 9–13, and then measured with a spectrophotometer to obtain CIEXYZ or CIELAB values. This includes printing a plurality color patches using both the particular cartridge 22 to be installed in imaging apparatus 12 and the particular cartridge 24 to be installed in imaging apparatus 12 in combination, and measuring the color patches to determine the combined colorant data corresponding to the combined colorant space of the particular cartridge 22 and the particular cartridge 24.

As set forth above, step S102-3 also includes printing color patches and measuring the color patches using many different sets of cartridges of the same type as cartridge 22 and cartridges of the same type as cartridge 24 in combination, to determine combined colorant data. The combined colorant data is used in part to determine combined cartridge reference output data that reflects the output of the average cartridge 22 when used in combination with the average cartridge 24, for example, by averaging the measurement results of many color patches printed by using the different sets of cartridges.

At steps S102-5, combined relative colorant variation data is determined using the combined colorant data and the combined cartridge reference output data. The combined relative colorant variation data is descriptive of a colorant output variation of the usage combination of any cartridge 22 type cartridge in conjunction with any cartridge 24 type cartridge, and hence, is descriptive of a colorant output variation of the usage combination of the particular cartridge 22 and the particular cartridge 24 relative to the combined cartridge reference output data. In the present embodiment, the combined relative colorant variation data takes the form of matrices, e.g., combined relative colorant variation matrices. However, those skilled in the art would appreciate that the combined relative colorant variation data may take any convenient form without departing from the scope of the present invention. For example, the combined relative colorant variation data may take the form of groups of polynomials.

Similar to the relative colorant variation matrix for individual cartridges, $R_c$ is used to denote the combined relative colorant variation matrix:

$$R_c\{r_{cij}\} i=0,1,\ldots,q-1, j=0,1,\ldots,v-1 \quad \text{(Equation 14)}$$

The arrangement of the elements ($r_{cij}$) is parallel to $\phi_c$ shown in Equation 9. Each of the elements ($r_{cij}$) is computed by $$r_{cij} = \frac{\Delta x_{cij}}{x_{scij}} \quad \text{(Equation 15)}$$

where $\Delta x_{cij}$ is the colorant change required for a non-standard cartridge set, e.g., the particular cartridge 22 and the particular cartridge 24, to produce the same color as the standard cartridge set, e.g., a standard cartridge 22 and a standard cartridge 24 as represented by the combined cartridge reference output data, at the colorant digital count $x_{scij}$ in the combined colorant space.

The computation procedure for the colorant change $\Delta x_{cij}$ is as follows:

For a given colorant point ($\phi_{sc}$), compute the color value ($\xi_{sc}$) for the standard cartridge set (e.g., the combined cartridge reference output data reflecting the average cartridge 22 used in conjunction with the average cartridge 24) using Equation 13.

Use the color value ($\xi_{sc}$) to replace the left-side value ($\xi_c$) of non-standard cartridge set's Equation 12 and then perform an inverted computation to find an associated colorant point ($\phi_c$) The colorant change $\{\Delta x_{cij}\}$ will be equal to $\phi_c - \phi_{sc} = \{x_{cij} - x_{scij}\}$, that is $$\Delta x_{cij} = x_{cij} - x_{scij}, i=0,1,\ldots,q-1, j=0,1,\ldots,v-1 \quad \text{(Equation 16)}$$

At step S102-7, cross-variation data, in the form of cross-variation factors, is estimated as set forth below. The cross-variation data is descriptive of the average output of different sets of cartridges of the same type as cartridge 22 and cartridges of the same type as cartridge 24, used in combination, relative to the average colorant output of the type of cartridge corresponding to cartridge 22 individually and to the average colorant output of the type of cartridge corresponding to cartridge 24 individually. Hence, the cross-variation data is descriptive of the combined colorant output variation of the usage combination of cartridge 22 and cartridge 24, e.g., the variation of colorant output of cartridge 22 and cartridge 24 used in combination, relative to the colorant output of each of cartridge 22 and cartridge 24 used individually. The cross-variation data is estimated based on the combined relative colorant variation data, cartridge 22 relative colorant variation data, and cartridge 24 relative colorant variation data.

As set forth above, when the combined colorant space is sampled, different types of non-standard cartridges (e.g., CMY cartridge 22 & Kcm cartridge 24) and different types of standard cartridges, e.g., data representing the average output of cartridges of the same type as cartridge 22 and data representing the average output of cartridges of the same type as cartridge 24, are used to obtain the combined relative colorant variation matrix as shown in Equations 14–15. At the same time, the individual relative colorant variation matrices (Equations 6–7) can be obtained using the individual signature color profiles (Equations 2–3) of the same individual cartridges. Generally, for the same ink digital count $x_{ij}=x_{cij}$ ($x_{ij}$ is in individual colorant space, $x_{cij}$ is in combined colorant space), the relative colorant variation ($r_{ij}$ in Equation 7) is different from the combined relative colorant variation ($r_{cij}$ in Equation 15) due to the interaction of the diffraction and reflection between different colorants from different types of cartridges (e.g., between CMY and Kcm colorants). The ratio between the combined and individual relative colorant variations is defined as a cross-variation factor for each ink:

$$\lambda_{ij} = \frac{r_{cij}}{r_{ij}} \quad i = 0, 1, \ldots, q-1, j = 0, 1, \ldots, v-1 \quad \text{(Equation 17)}$$

For example, in a CMYKcm printer (q=2 types of cartridge, v=3 inks for each type of cartridge), using one pair of CMY cartridges (one is standard, representing the average CMY cartridge, and the other is non-standard) and one pair of Kcm cartridges (also, one is standard, representing the average Kcm cartridge, and the other is non-standard) will produce one cross-variation factor matrix as shown in Equation 17. When more pairs of CMY and Kcm cartridges are used, different cross-variation factor matrices will be obtained. For example, a statistically significant number of pairs may be used, wherein each pair consists of a cartridge of the same type as cartridge 22 and a cartridge of the same type as cartridge 24. In the present embodiment, the average cross-variation factor matrix taken from a plurality of cross-variation factor matrices will be used as the cross-variation data for performing color correction in accordance with the present invention.

When the cross-variation factor is determined, the corresponding digital counts of the colorant point ($\phi_{sc}$) in the combined colorant space are known. Thus, the relationship between the average cross-variation factors and the colorant digital counts in the combined colorant space can be established by:

$$\lambda = w(\phi_{sc}) \quad \text{(Equation 18)}$$

where $\lambda$ is cross-variation matrix (vector) whose elements are $\lambda_{ij}$ as shown in Equation 17, and w denotes the function relationship implemented as a lookup table or a group of polynomial functions.

At step S102-9, the cross-variation data is stored in a memory accessible by imaging system 10. In the present embodiment, the cross-variation data is stored in a memory accessible by imaging apparatus 12, for example, memory 36 of controller 18. Alternatively, it is contemplated that cartridge 22 reference output data and cartridge 24 reference output data may be stored along with imaging driver 58.

Figure 6:
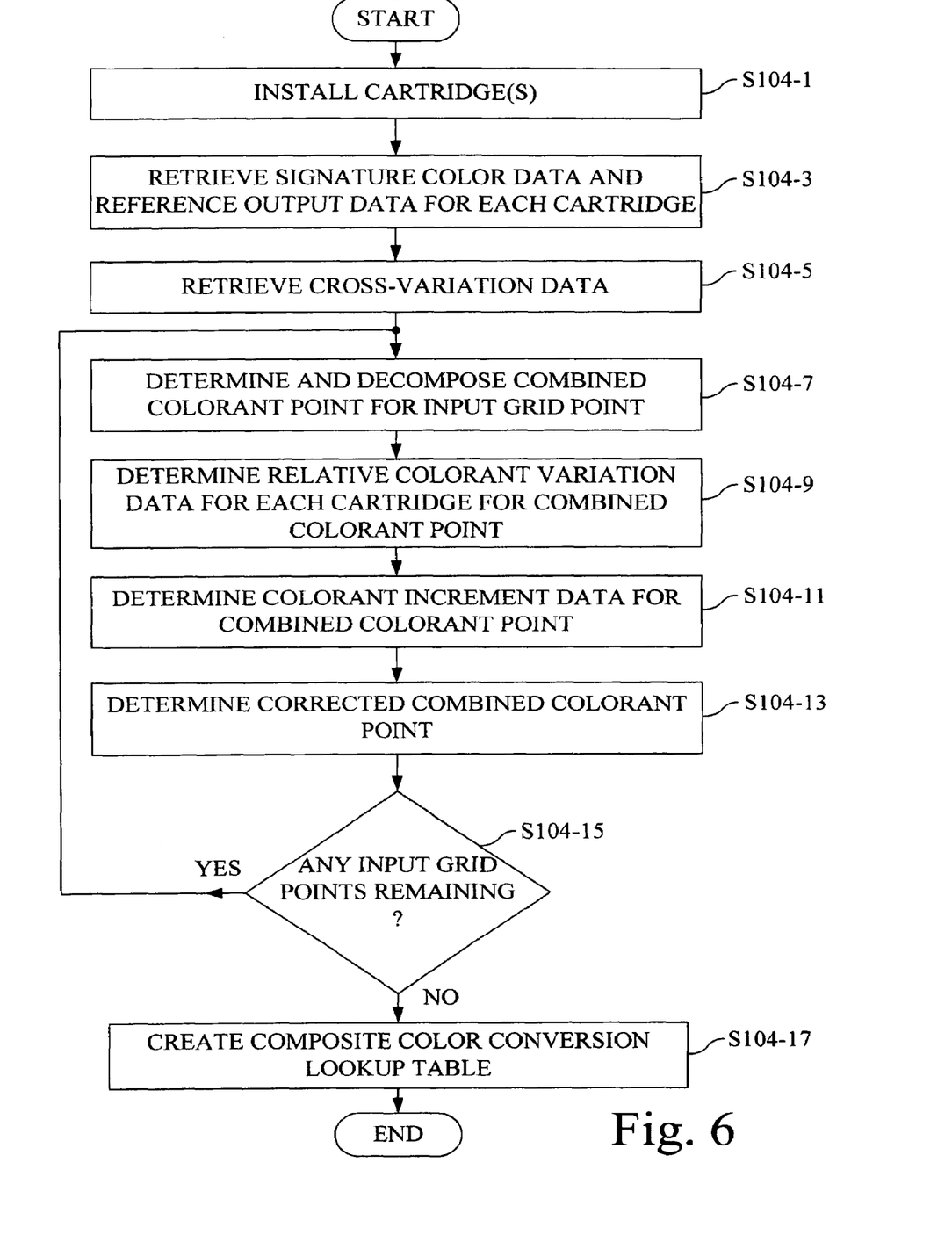
FIG. 6 is a flowchart that depicts a method of determining color correction data and modifying a color conversion lookup table in accordance with an embodiment of the present invention.

Referring now to FIG. 6, the determination of color correction data based on the individual cartridge characterization data determined in step S100 and the combined cartridge characterization data determined in step S102, and the modification of standard color conversion lookup table 62 based on the color correction data for printing using cartridge 22 and cartridge 24, as set forth in step S104 of FIG. 3, is described in detail below with respect to steps S104-1 to S104-15. The processes described in steps S104-1 to S104-15 are performed using imaging apparatus 12 and/or imaging system 10.

For an imaging apparatus with multiple types of cartridges, the relationship between input and output (called standard lookup table) for the standard cartridges (e.g., the average of the particular type of cartridge) can be expressed by $$\phi_{sc} = g(\psi) \quad \text{(Equation 19)}$$

where $\phi_{sc}$ is a combined colorant point in the combined colorant space of the multiple types of standard cartridges as expressed in Equation 10, $\psi$ is an input image point (e.g., Red, Green, and Blue digital counts (R, G, B) of an image pixel), and g denotes the function relationship implemented as a lookup table or a group of polynomial functions. When non-standard cartridges (e.g., a particular cartridge 22 and a particular cartridge 24) are used, the above relationship should be modified due to the cartridge color shifts in order to produce consistent color outputs as produced by the standard cartridges. The modification procedures are performed any time a cartridge is installed, and are set forth as follows. Step S104-1 is typically performed by a user of imaging system 10, whereas steps S104-3 to S104-15 are performed automatically by imaging system 10, for example, by controller 18 executing instructions to perform each step.

At step S104-1, cartridge 22 and cartridge 24 are installed into imaging system 10 (imaging apparatus 12).

At step S104-3, cartridge 22 signature color data, cartridge 24 signature color data, cartridge 22 reference output data, and cartridge 24 reference output data are retrieved from the respective memories in which the data was stored. Note that if the current substrate installed in imaging apparatus 12 is different from the color calibration substrate used at the factory, an estimation method may be employed to "translate" the color values of the different cartridges into those appropriate to the current substrate.

At step S104-5, the cross-variation data is retrieved from memory. For example, the cross-variation factor matrices $\{\lambda_{ij}\}$ are read from the memory in which they were stored, for example, read from memory 36 of controller 18 or obtained from imaging driver 58.

At step S104-7, a combined colorant point for a selected input grid point is determined and decomposed as follows:

For each input grid point ($\psi$) in Equation 19, find the corresponding combined colorant point $\phi_{sc}$ using Equation 19. Decompose $\phi_{sc}$ into individual colorant point $\phi_{si}$ shown in Equation 5 and containing ink digital count $x_{sij}$ of each ink) corresponding to individual cartridges. By this decomposition, Equation 20 is obtained:

$$x_{scij} = x_{sij} \quad \text{(Equation 20)}$$

In accordance with Equation 20, for the standard cartridge (with subscription "s"), the ink digital count ($x_{scij}$) in the combined colorant space is equal to the ink digital count ($x_{sij}$) in the decomposed individual colorant space.

At step S104-9, individual cartridge relative colorant variation data in the form of a matrix, e.g., a relative colorant variation matrix for each cartridge, is determined. For example cartridge 22 relative colorant variation data, is determined based on cartridge 22 signature color data and cartridge 22 reference output data, and cartridge 24 relative colorant variation data is determined based on cartridge 24 signature color data and cartridge 24 reference output data, as set forth below:

For each cartridge, the individual relative colorant variation matrix $\{r_{ij}\}$ (Equation 7) is computed for the colorant point $\phi_{si}$ using the signature colors for cartridge 22 and cartridge 24, as well as using the standard cartridge color data (cartridge 22 reference output data and cartridge 24 reference output data) corresponding to cartridge 22 and cartridge 24, respectively.

As set forth above, in the present embodiment, the individual cartridge relative colorant variation data takes the form of a matrix. However, those skilled in the art would appreciate that the individual cartridge relative colorant variation data may take any convenient form without departing from the scope of the present invention. For example, the individual cartridge relative colorant variation data may take the form of groups of polynomials.

At step S104-11, colorant increment data, in the form of a colorant increment matrix, is determined based on the cross-variation data, cartridge 22 relative colorant variation data, and cartridge 24 relative colorant variation data, as set forth below. Because the cartridge relative colorant variation data is based on the cartridge signature color data for each cartridge, it is seen that the colorant increment data is determined based on the cross-variation data, cartridge 22 signature color data, cartridge 24 signature color data, cartridge 22 reference output data, and cartridge 24 reference output data.

For the colorant point $\phi_{sc}$, compute the colorant increment matrix using the individual relative colorant variation matrices and the cross-variation factor matrix. Each element ($\Delta x_{cij}$) in the colorant increment matrix, according to Equations 15, 17, and 20, is computed by $$\Delta x_{cij} = \lambda_{ij} r_{ij} x_{sij} \quad i=0,1,\ldots,q-1, j=0,1,\ldots,v-1 \quad (21)$$

As set forth above, in the present embodiment, the colorant increment data takes the form of a matrix. However, those skilled in the art would appreciate that the colorant increment data may take any convenient form without departing from the scope of the present invention. For example, the colorant increment data may take the form of groups of polynomials.

At step S104-13, a corrected combined colorant point is determined for the selected input grid point, as follows.

Compute a new (color-shift corrected) combined colorant point ($\phi_c$) for the new cartridges (e.g., cartridge 22 and cartridge 24 installed in step S104-1) whose digital count of each ink, according to Equation 16, is given by $$x_{cij} = x_{scij} + \Delta x_{cij} \quad i=0,1,\ldots,q-1, j=0,1,\ldots,v-1 \quad \text{(Equation 22)}$$

where $x_{scij}$ is the ink digital count of the combined colorant point ($\phi_{sc}$) from the standard color table (Equation 19).

At step S104-15, a determination is made as to whether any input grid points are remaining. If so, process flow proceeds back to step S104-7, and steps S104-7 to S104-15 are repeated until each input grid point has been addressed. For example, steps S104-7 to S104-15 are repeated until every input grid $\psi$'s colorant point ($\phi_{sc}$) is re-computed into a new colorant point ($\phi_c$), yielding colorant increment data lookup table 64.

At step S104-17, standard color conversion lookup table 62 is modified based on the colorant increment data, e.g., colorant increment data lookup table 64, to create composite color conversion lookup table 66 for use in printing with cartridge 22 and cartridge 24. For example, the relationship between ($\phi_c$) and ($\psi$) will form a new lookup table (composite color conversion lookup table 66):

$$\phi_c = g'(\psi) \quad \text{(Equation 23)}$$

where g' denotes the function relationship that may be implemented as a lookup table or a group of polynomial functions. By using composite color conversion lookup table 66, the newly installed cartridge 22 and cartridge 24 will print colors with fidelity similar to the standard cartridges.

While this invention has been described with respect to exemplary embodiments, it will be recognized that the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of correcting color shift caused by printing with an imaging system using a first cartridge and a second cartridge different from said first cartridge, comprising:
    determining individual cartridge characterization data based on each of said first cartridge and said second cartridge individually;
    determining combined cartridge characterization data that characterizes a usage combination of said first cartridge and said second cartridge; and
    determining color correction data based on said individual cartridge characterization data and said combined cartridge characterization data.

2. The method of claim 1, wherein said determining said individual cartridge characterization data includes:
    determining a plurality of first cartridge signature colors;
    printing a first plurality of color patches corresponding to said plurality of first cartridge signature colors using only said first cartridge;
    measuring said first plurality of color patches to determine first cartridge signature color data;
    determining a plurality of second cartridge signature colors;
    printing a second plurality of color patches corresponding to said plurality of second cartridge signature colors using only said second cartridge; and
    measuring said second plurality of color patches to determine second cartridge signature color data.

3. The method of claim 2, wherein said determining said individual cartridge characterization data further includes:
    determining, based on said first cartridge signature color data, first cartridge relative colorant variation data descriptive of a colorant output variation of said first cartridge relative to first cartridge reference output data; and
    determining, based on said second cartridge signature color data, second cartridge relative colorant variation data descriptive of a colorant output variation of said second cartridge relative to second cartridge reference output data.

4. The method of claim 1, wherein said combined cartridge characterization data characterizes a visual effect of an interaction between a colorant of said first cartridge and a colorant of said second cartridge.

5. The method of claim 4, wherein said visual effect of said interaction includes at least one of a diffraction difference and a reflection difference as between portions of an image printed with a combination of said colorant of said first cartridge and said colorant of said second cartridge, portions of said image printed using only said colorant of said first cartridge individually, and portions of said image printed using only said colorant of said second cartridge individually.

6. The method of claim 1, wherein said determining said combined cartridge characterization data includes:
   printing a plurality of color patches using a cartridge set made up of a cartridge of the same type as said first cartridge and a cartridge of the same type as said second cartridge used in combination;
   measuring said plurality of color patches;
   repeating a plurality of times said printing said plurality of color patches and said measuring said plurality of color patches using different sets of cartridges, each of said different sets being made up of a different cartridge of the same type as said first cartridge and a different cartridge of the same type as said second cartridge used in combination, to determine combined colorant data; and
   determining combined relative colorant variation data using said combined colorant data, said combined relative colorant variation data being descriptive of a colorant output variation of said usage combination of said first cartridge and said second cartridge relative to combined cartridge reference output data.

7. The method of claim 6, wherein said determining said combined cartridge characterization data further includes estimating cross-variation data descriptive of a combined colorant output variation of said usage combination of said first cartridge and said second cartridge relative to a colorant output of each of said first cartridge and said second cartridge individually.

8. The method of claim 7, wherein said cross-variation data is estimated based on said combined relative colorant variation data, first cartridge relative colorant variation data descriptive of a colorant output variation of said first cartridge relative to first cartridge reference output data; and second cartridge relative colorant variation data descriptive of a colorant output variation of said second cartridge relative to second cartridge reference output data.

9. The method of claim 1, further comprising modifying a standard color conversion lookup table based on said color correction data for printing using said first cartridge and said second cartridge.

10. The method of claim 1, further comprising:
   storing first cartridge signature color data and second cartridge signature color data in a first memory accessible by said imaging system;
   storing first cartridge reference output data and second cartridge reference output data in a second memory accessible by said imaging system; and
   storing cross-variation data in said second memory, said cross-variation data being descriptive of a combined colorant output variation of said usage combination of said first cartridge and said second cartridge relative to a colorant output of each of said first cartridge and said second cartridge individually.

11. The method of claim 10, wherein said determining said color correction data is performed by said imaging system, said determining said color correction data including:
   retrieving said first cartridge signature color data and said second cartridge signature color data from said first memory;
   retrieving said first cartridge reference output data, and said second cartridge reference output data from said second memory;
   retrieving said cross-variation data from said second memory; and
   determining colorant increment data based on said cross-variation data, said first cartridge signature color data, said second cartridge signature color data, said first cartridge reference output data, and said second cartridge reference output data.

12. The method of claim 11, wherein said determining said colorant increment data includes:
   determining, based on said first cartridge signature color data and said first cartridge reference output data, first cartridge relative colorant variation data descriptive of a colorant output variation of said first cartridge relative to said first cartridge reference output data;
   determining, based on said second cartridge signature color data and said second cartridge reference output data, second cartridge relative colorant variation data descriptive of a colorant output variation of said second cartridge relative to said second cartridge reference output data; and
   determining said colorant increment data based on said cross-variation data, said first cartridge relative colorant variation data, and said second cartridge relative colorant variation data.

13. The method of claim 11, further comprising modifying a standard color conversion lookup table based on said colorant increment data to create a composite color conversion lookup table for use in printing with said first cartridge and said second cartridge.

14. The method of claim 1, wherein each of said first cartridge and said second cartridge include at least one non-black colorant.

15. An imaging system that performs correction of a color shift caused by printing with a first cartridge and a second cartridge different from said first cartridge, comprising:
   a print engine configured to mount said first cartridge and said second cartridge; and
   a controller communicatively coupled to said print engine, said controller executing instructions to:
      retrieve first cartridge signature color data and second cartridge signature color data from a first memory accessible by said imaging system;
      retrieve first cartridge reference output data and second cartridge reference output data from a second memory accessible by said imaging system;
      retrieve cross-variation data from said second memory, said cross-variation data being descriptive of a combined colorant output variation of a usage combination of said first cartridge and said second cartridge relative to a colorant output of each of said first cartridge and said second cartridge individually; and
      determine colorant increment data based on said cross-variation data, said first cartridge signature color data, said second cartridge signature color data, said first cartridge reference output data, and said second cartridge reference output data.

16. The imaging system of claim 15, said controller further executing instructions to:
   determine, based on said first cartridge signature color data, first cartridge relative colorant variation data descriptive of a colorant output variation of said first cartridge relative to said first cartridge reference output data;

determine, based on said second cartridge signature color data, second cartridge relative colorant variation data descriptive of a colorant output variation of said second cartridge relative to said second cartridge reference output data; and determine said colorant increment data based on said cross-variation data, said first cartridge relative colorant variation data, and said second cartridge relative colorant variation data.

17. The imaging system of claim 15, further comprising a standard color conversion lookup table stored in said second memory, said controller executing instructions to modify said standard color conversion lookup table based on said colorant increment data to create a composite color conversion lookup table for use in printing with said first cartridge and said second cartridge.

18. The imaging system of claim 15, wherein each of said first cartridge and said second cartridge include at least one non-black colorant.

19. A method of correcting color shift caused by printing with multiple cartridges, comprising:

determining individual cartridge signature colors;

computing relative colorant variation matrices of individual cartridges;

estimating cross-variation factor matrices among different types of cartridges; and modifying a lookup table for color correction.

20. The method of claim 19, wherein each of said individual cartridges includes at least one non-black colorant.

* * * * *